United States Patent [19]

Rothstein

[11] Patent Number: 4,851,773
[45] Date of Patent: * Jul. 25, 1989

[54] ROTATING HEAD PROFILOMETER PROBE

[76] Inventor: Samuel Rothstein, 79-19 269th St., New Hyde Park, N.Y. 11040

[*] Notice: The portion of the term of this patent subsequent to Nov. 25, 2003 has been disclaimed.

[21] Appl. No.: 881,095

[22] Filed: Jul. 2, 1986

Related U.S. Application Data

[63] Continuation-in-part of Ser. No. 558,955, Dec. 7, 1983, Pat. No. 4,625,165, which is a continuation-in-part of Ser. No. 306,175, Sep. 28, 1981, abandoned.

[51] Int. Cl.$^4$ .................. G01N 27/90; G01B 5/20; G01B 7/28; G21C 17/00
[52] U.S. Cl. .................. 324/220; 33/178 F; 33/302; 324/207; 376/249
[58] Field of Search .................. 324/219–221, 324/22; 165/11.2; 33/178 E, 178 F, 302; 73/105, 151, 152, 623; 376/245, 249, 258

[56] References Cited

U.S. PATENT DOCUMENTS

| 2,239,981 | 4/1941 | Terry et al. | 33/178 E |
| 2,810,203 | 10/1957 | Bachofer | 33/178 F |
| 3,238,448 | 3/1966 | Wood et al. | 324/220 |
| 3,727,126 | 4/1973 | Kiselman et al. | 324/221 |
| 3,939,570 | 2/1976 | Loftus | 33/178 E |
| 4,021,925 | 5/1977 | Loftus | 33/178 E |
| 4,186,494 | 2/1980 | Edouard et al. | 33/178 E |
| 4,235,020 | 11/1980 | Davis | 33/178 F |
| 4,247,985 | 2/1981 | Boyle | 33/178 F |
| 4,341,113 | 7/1982 | Gutzwiller | 324/220 X |
| 4,365,197 | 12/1982 | Pyatt et al. | 324/221 |
| 4,441,078 | 4/1984 | LeComte | 324/219 |
| 4,461,171 | 7/1984 | de la Cruz | 73/151 |
| 4,485,560 | 12/1984 | Fournier et al. | 33/178 F |
| 4,625,165 | 11/1986 | Rothstein | 324/220 |

FOREIGN PATENT DOCUMENTS

| 018826 | 11/1980 | European Pat. Off. |
| 0077730 | 4/1983 | European Pat. Off. |
| 2383426 | 10/1978 | France |
| 2429994 | 1/1980 | France |

Primary Examiner—Gerard R. Strecker
Attorney, Agent, or Firm—Brooks Haidt Haffner & Delahunty

[57] ABSTRACT

An electro-mechanical eddy current probe having a rotatable sensing head for sensing the wall thickness of and locating local defects in a tube or conduit through which it is passed. The rotatable head includes a radially movable, outward projecting sensing member which is spring-biased into engagement with the interior surface of the tube and which carries an eddy current coil or which actuates either the core of a differential transformer, a strain gauge or a rheostat, each electrically monitored by the probe. The cylindrical probe is centered within the tube by a pair of centering guides at either of its ends. The probe also carries a fixed eddy current coil on its non-rotating body portion for detecting and anticipating locations of particular interest within the tube where the longitudinal movement of the probe should be slowed, such as locations of exterior tube support plates where denting is more apt to occur.

16 Claims, 6 Drawing Sheets

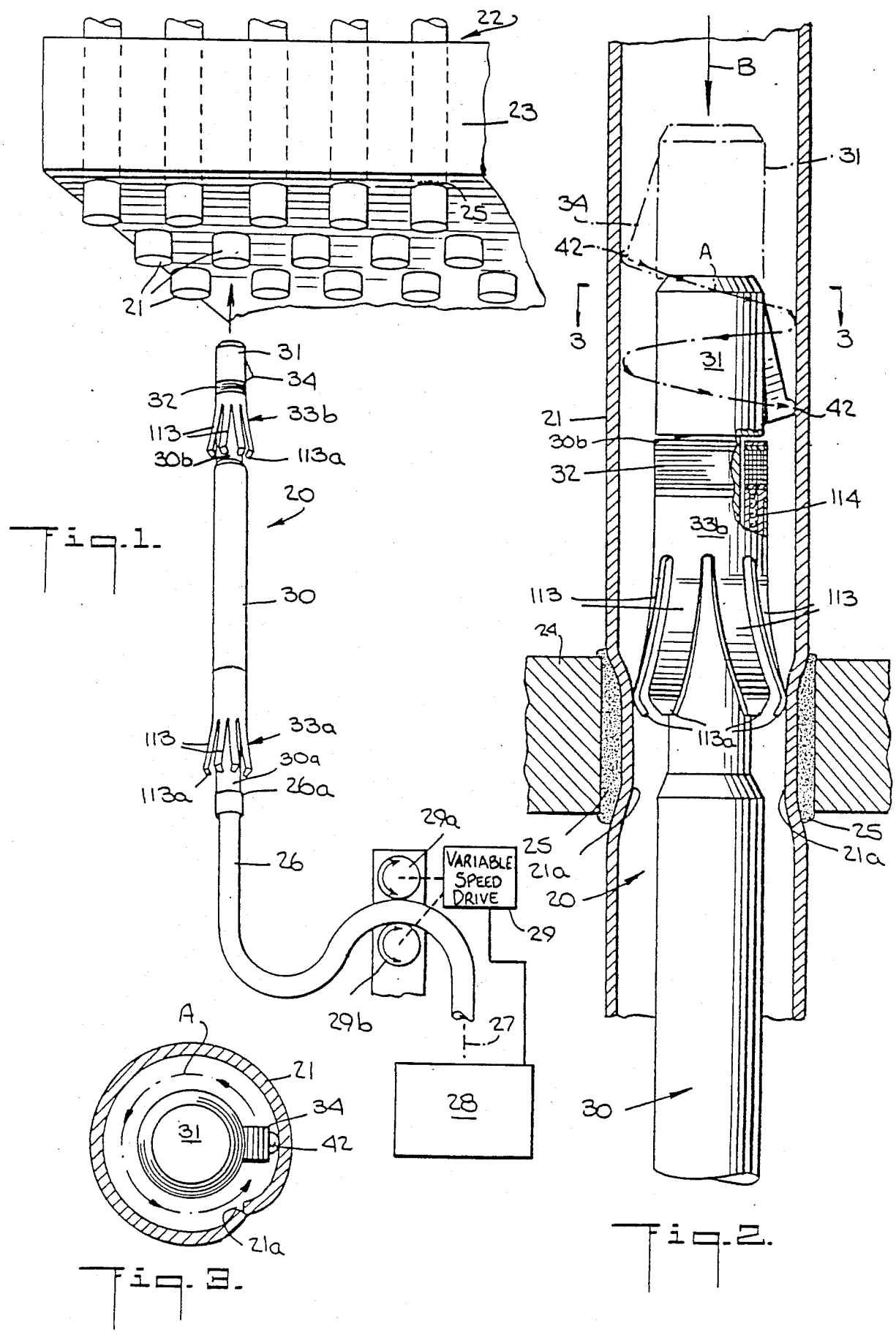

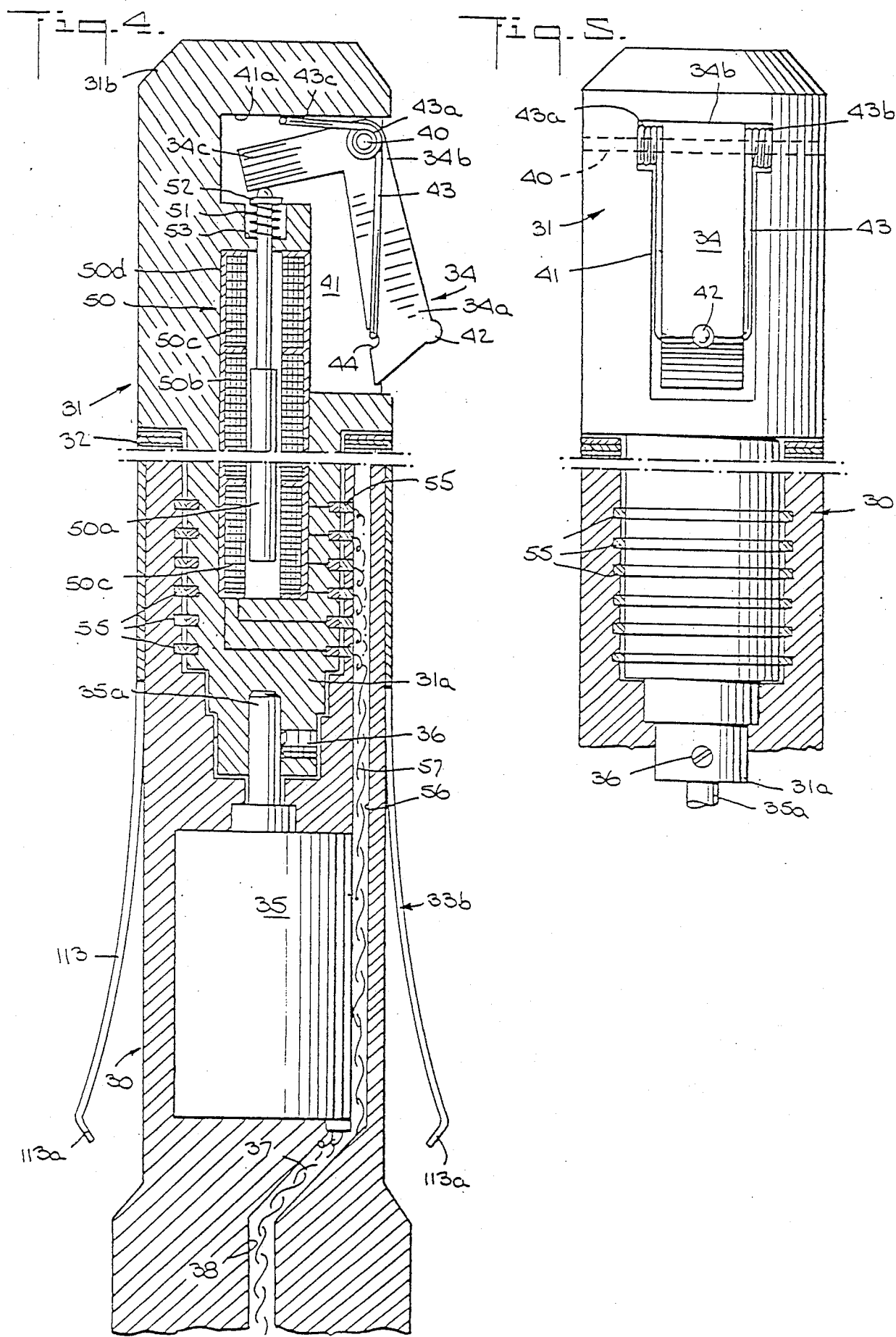

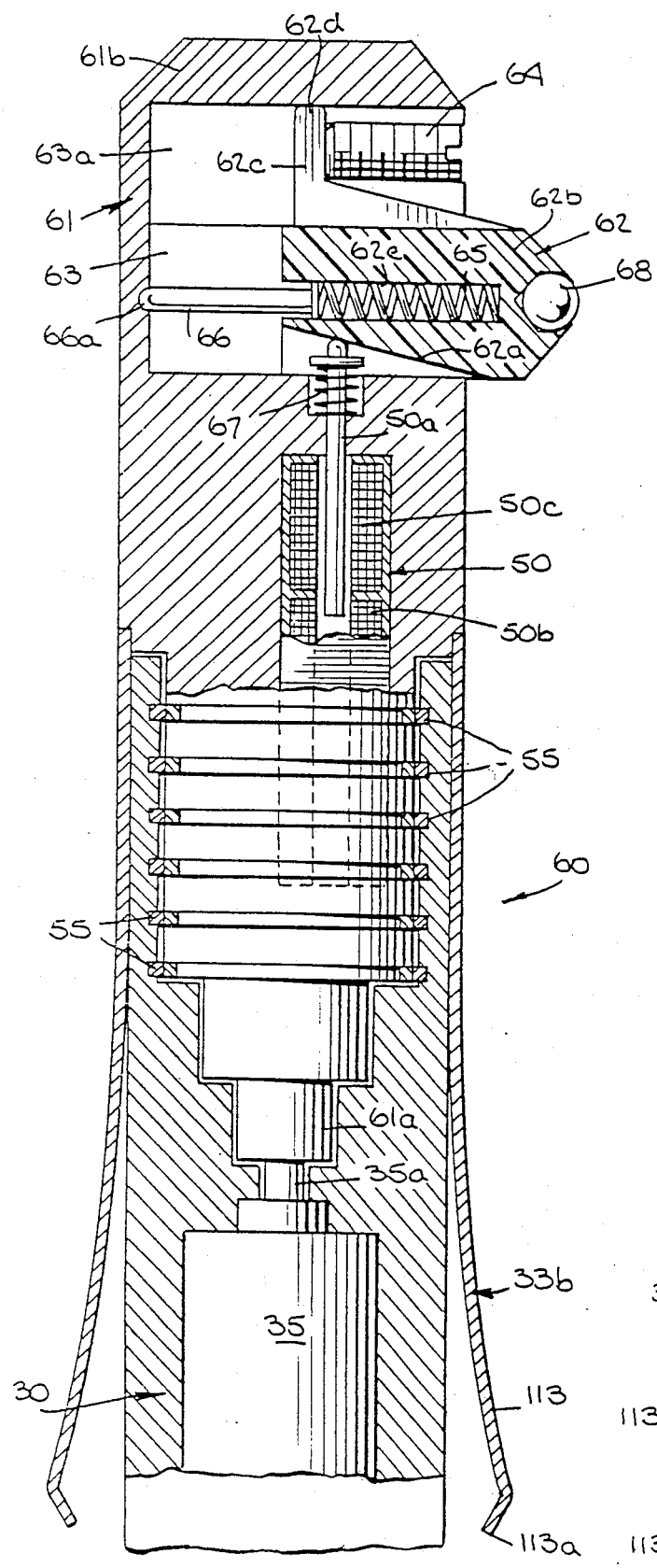
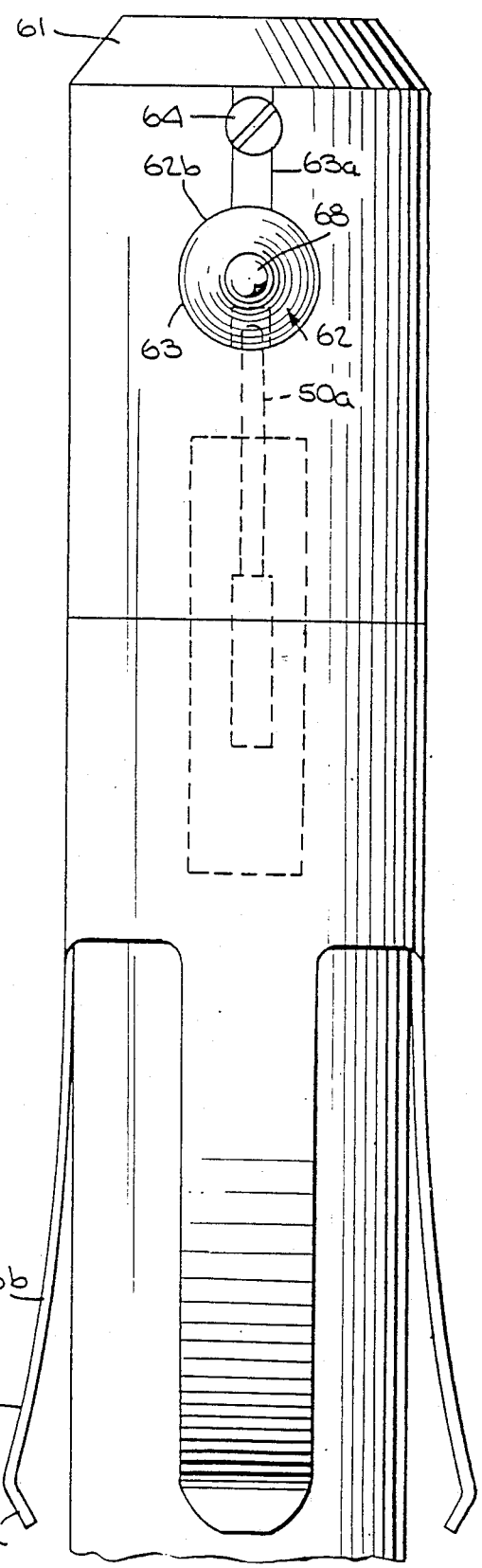
Fig. 6.
Fig. 7.

ROTATING HEAD PROFILOMETER PROBE

This application is a continuation-in-part of copending application Ser. No. 558,955, filed Dec. 7, 1983 now Pat. No. 4,625,165 which is a continuation-in-part of application Ser. No. 306,175, filed Sept. 28, 1981 and now abandoned.

FIELD OF THE INVENTION

This invention relates to profilometry techniques and, more particularly, to electro-mechanical profilometer probes for insertion into tubes or the like to sense their interior shapes.

Although the invention was made during a study towards improving techniques used for examining the interiors of steam generator tubes and will therefore be described in connection with such use, it will be understood that the invention may have other uses, such as for examining the interiors of larger or smaller tubes or tubular members, or the interiors of gas service lines or other types of conduits.

BACKGROUND OF THE INVENTION AND THE PRIOR ART

Those familiar with the operation and maintenance of steam generators understand that, during system downtime, the tubes of the steam generator must be inspected, and defective tubes plugged or replaced. It is also known that steam generator tubes may be preventively plugged, in advance of leaks actually occurring therein, if an examination of the interior of the tube indicates the presence of high strain which, in turn, indicates incipient breakage. As the strain increases, the susceptibility to stress corrosion cracking increases It is therefore an object of the present invention to provide a more effective means of examining tube interiors to detect the presence or not of such strain which, in turn, will indicate the likelihood or not for tube breakage during reactivated use of the tube.

Distortion of the tube interior shape, commonly called "denting", is known to be associated with strain in the metal of which the tube is made. However, a mere presence of "denting" is not sufficient, in itself, to provide information for predicting the life of a tube having "denting". Therefore, more accurate determination of such strain by more accurate determination of relevant interior distortion of the tube, is a means by which predictions regarding tube cracking can be improved. Thus, it is intended by the present invention to provide an interior probe for tubes, such as steam generator tubes, for more accurately sensing tube distortion from which, in turn, the extent of strain in the tube can be more accurately calculated.

For example, especially in modern pressurized water reactor steam generators, "denting" occurs during operation by reason of an accumulation of corrosion products between the tube support plates and the tubes themselves. This distortion results in strain which, if high enough, makes the tube susceptible to stress corrosion cracking. In the past, it was believed that the larger the dent the greater was the strain, and eddy current inspection techniques have therefore been used to evaluate the size of these "dents". Such non-destructive examination of steam generator tubes has been developed from previously known eddy current techniques for detecting defects in the tubing, such as existing cracks and the like, and the interpretation of eddy current signals indicating the existence of denting is based on a comparison with known signals from standards Although denting can thus be quantified, eddy current measurements for this purpose have been found to be generally insufficient for the forecasting of tube life because, at best, they measure only the average tube diameter at any given location within the length of the tube. Accordingly, tube leaks cannot be accurately predicted using eddy current measurements.

Another known technique for measuring denting is that which utilizes an eight-fingered probe to concurrently measure the several inside radii of the tube at eight "finger" locations about its circumference as the probe is drawn through the tube, by sensing the extent of deflection of respective strain gauges mounted on the fingers, which data is then used as input to a computer to calculate strain. An example of such a probe is disclosed in U.S. Pat. No. 4,341,113. Such electromechanical gauging represents an improvement over eddy current inspection techniques, but is subject to significant error at high strain locations because the data is limited to eight radii. In this regard, it was found that increasing the data points to twelve or sixteen causes the probe to become unwieldy, without significant increase in accuracy.

Inspection and testing of steam generator tubes over a period of many years with the prior art probes described hereinbefore have shown that neither type of probe provides sufficient correlation between the data obtained thereby and the tube strain to be able to predict with reasonable accuracy of the life of a tube and hence, which tubes should be taken out of service. Therefore, as a matter of practice, some tubes were often taken out of service, thereby reducing the service life of a steam generator, when they need not be taken out of service, and in some cases, tubes were left in service when they should not have been because leaks subsequently developed.

Both of the aforementioned interior probing techniques are primarily designed to accurately detect locations of maximum denting within the tube which, as previously mentioned, were thought to correspond with the locations of maximum strain. However, I have found that maximum strain in a tube does not necessarily occur at a location of maxiumum denting but, rather, may occur at different locations depending upon the distorted shape or profile of the tube. That is, tube strain due to denting is more aptly composed of a circumferential membrane component and a bending component, considering the effect of axial strain to be negligible. I define the membrane component as the change in the circumference of the tube divided by its original circumference, and the bending component as the local change of length compared to the initial length at the specific location of the membrane component. Thus, circumferential or hoop strain can be determined on the basis of such deformed interior profile of the tube. It therefore becomes important to know the complete circumferential profile of the tube at locations of particular interest within the tube interior, and it is intended by the present invention to provide such capability.

Another problem encountered with said prior art probe is that although they may indicate a "dent", they do not necessarily indicate the location of a "dent" relative to the length of the tube. The characteristics of the "dents" at the tube supports are the most important characteristics to be considered in forecasting tube life. The tube supports are not necessarily located at points fixed distances apart or at specific locations from the tube ends. The prior art probes will frequently provide signals at dents which can be confused with signals indicating the presence of a tube support.

This possibility of confusion of signals also arises with the rotatable sensing member on the probe of the invention. Thus, while the rotatable sensing member on the probe of the invention provides much more information on the characteristics of a dent, e.g., shape as well as radially inward size, it does not clearly indicate the location of a tube support since a dent of such characteristics may appear other than at a support. However, a fixed position eddy current coil of proper sensitivity can provide signals which clearly distinguish between a "dent" and a tube support. Accordingly, a fixed position eddy current coil is included in the probe of the invention not to detect tube distortion, as in the prior art, but to provide signals which clearly indicate the locations of tube supports as distinguished from "dents".

An eddy current coil for indicating the location of the tube supports is also useful for controlling the speed at which the probe is drawn through a tube being inspected. In the prior art, it has been the practice to pull the probe through a tube at a relatively low speed in order to provide what was believed to be sufficient information for identifying "dents". However, since the "dents" of most importance are located at the tube supports much time is wasted, and the inspection of a tube is lengthy, during the travel of a probe between tube supports.

Accordingly, the invention provides not only the capability of measuring tube profile distortion in three dimensions, i.e. radially, axially and circumferentially of a tube, but also the capability for determining locations of exterior support plates along the length of the tube, which information can be correlated with the tube profile measurements to determine where along the tube length any such distortion has occurred and can be used to vary the speed of movement of the probe through a tube. Such knowledge of the precise locations of tube distortions affords a more positive understanding of the causes of tube distortions.

BRIEF DESCRIPTION OF THE INVENTION

Briefly and generally describing the present invention, it provides a profilometer probe having a motor-driven rotatable head mounted thereon for rotation about the longitudinal axis of the probe. The rotatable head carries a transverse, outwardly projecting and radially movable sensing member which is biased in the outward direction and rotates in contact with the interior wall surface as the probe unit is moved longitudinally through the tube whose profile is to be determined. Thus, the tube surface is continually sensed, in a spiral line pattern, in terms of the changes in interior radius of the tube as measured from the centerline of the probe.

The rotating head is driven by an electric gear motor mounted within the main body of the probe, and rotates continuously at a steady rate. Any radial movement of the sensing member produces electrical signals indicative of such movement, and thus a steady flow of tube-surface data is collected, from which the complete tube profile can be plotted. That is, these radial measurements are monitored by electric sensing apparatus, and either recorded or fed directly into a computer for use in plotting the tube profile and determining the amount of tube distortion at particular locations, whereupon the consequent tube strain values are calculated for such locations.

Accurate determination of the locations at which the changes in the tube profile occur, is determined from signals of reading a separate eddy current locator coil mounted on the non-rotating main body portion of the probe, which signals are correlated with the tube profile signals.

Preferably, the probe is drawn through a tube to be inspected by a drive means which has at least two different drive speeds, and the speed of the drive means is controlled by the eddy current coil locator coil signals so that the probe is pulled relatively slowly when said sensing member is adjacent a tube support and is pulled relatively rapidly when said sensing member is intermediate the tube supports.

The profilometer probe is mounted on the end of a stiff but flexible hollow plastic cable tubing, which contains the electric lead wires to the probe, and by which it is pushed and pulled through the tube whose profile is to be determined. For a more controllable and uniform rate of movement, the readings from the rotating sensing head and the eddy current coil are taken only as the probe is pulled from the opposite end of the tube back towards the open end into which it was inserted and initially pushed to the far end of the tube, by feeding the flexible cable tubing into the tube. A motorized pulling system is used to withdraw the cable tubing and, thus, the probe moves longitudinally at a steady rate, which is slowed, or if desired, the probe is stopped, as the probe passes or reaches tube regions of possibly greater interest in order to obtain more closely spaced readings from the sensing member or the rotating head, which rotates at a constant rate. Electric wires within the flexible cable conduct the profile and eddy current coil signals either to a strip chart recorder, or directly into a computer for obtaining an immediate profile, and computation of strain.

The invention contemplates the use of any of several modifications of the profile sensing apparatus within the probe. In the presently preferred embodiment the sensing member has an inverted substantially L-shaped configuration, and is mounted for spring-biased, pivoting movement on the rotating head, about a pivot transversely through the apex, or location of conjunction between the legs of the L-shape. The longer leg of the L-shape extends outwardly from the probe, and a spring biases its free end in radially outward direction with respect to the cylindrically shaped probe body, so that it will contact and ride along the tube interior wall during use of the probe. The radially inward and outward movement of this longer leg of the L-shape and its pivotal connection at the apex, causes substantially reciprocal movement of the free, shorter end of the L-shape which is disposed on the longitudinal centerline of the cylindrical probe. In turn, such movement of the shorter end of the L-shaped sensing member causes longitudinal movement of the core member of a linear variable differential transformer (LVDT) mounted within the probe head, to thus cause a change of the electric current flow through the transformer coil.

The longitudinal movement of the LVDT core can also be effected by the radially inward and outward movement of a slidably mounted sensing member, having a sloping surface in engagement with the end of the longitudinal core member. The slidable sensing member is spring-biased outwardly, and the core member is spring-biased into engagement with the sloping surface.

In another modified form of the invention, the LVDT sensing device is replaced by a strain-gauge type sensor which is operated by the aforementioned sloping surface of a slidable sensing member mounted on the rotatable probe head. That is, instead of engaging and depressing the core member of an LVDT, the sloping surface engages and depresses a similar longitudinal member which, in turn, deflects a transversely disposed spring to which a strain gauge is attached. Signals from the strain gauge thus indicate the extent of inward and outward movement of the sensing member.

In other modified forms of the sensing member, its sloping surface is eliminated, and its radial movement is sensed by a rheostat-type sensor, the rheostat contact being mounted on the movable sensing member with the rheostat coil being attached in effectively fixed position on the rotating head. Alternatively, the rheostat contact may be in fixed position on the rotating head, in point contact with a linear resistance tape attached to the slidable sensor.

In another form, the radially inwardly and outwardly slidable member carries an eddy current coil near its tip so that the coil is always at a fixed distance from the interior wall surface of the tube when the probe is passing longitudinally therethrough. Changes in wall thickness at dent locations or elsewhere along the tube wall cause changes of current flow through the coil, which are detected and recorded, and from which the comparative degrees of the denting or change in wall thickness, which is an indication of the tube strain or defect can be ascertained.

When the thus ascertained interior profile of the tube indicates that strain has developed to a value which is known to indicate active stress corrosion and incipient tube breakage, the tube is preventively plugged at both ends to effectively remove it from service. Of course, if the last-mentioned sensor device is used so that changes in tube wall thickness are indicated, the tube is preventively plugged if the wall thickness at any location is found to be less than acceptable.

DETAILED DESCRIPTION OF PREFERRED EMBODIMENTS

These and other objects, features and advantages of the invention will be apparent from the following detailed description of presently preferred embodiments thereof, which should be read with reference to the accompanying drawings in which:

FIG. 1 is a fragmentary perspective view of one end of a vertical steam generator tube bundle, illustrating an inspection probe in accordance with the present invention just prior to its introduction into one of the tubes in the bundle;

FIG. 2 is an enlarged and fragmentary sectional view of a tube at a tube support plate location, and having a probe in accordance with the present invention within the tube;

FIG. 3 is a cross-sectional view as seen from line 3—3 in FIG. 2;

FIG. 4 is a further enlarged and fragmentary sidesectional view illustrating details of the inspection probe generally illustrated in FIGS. 1–3;

FIG. 5 is a fragmentary sectional front view of only a part of the FIG. 4 showing;

FIG. 6 is a fragmentary side-sectional view of an inspection probe embodying a modified form of the present invention;

FIG. 7 is a fragmentary front view of the FIG. 6 showing;

Figure 12:
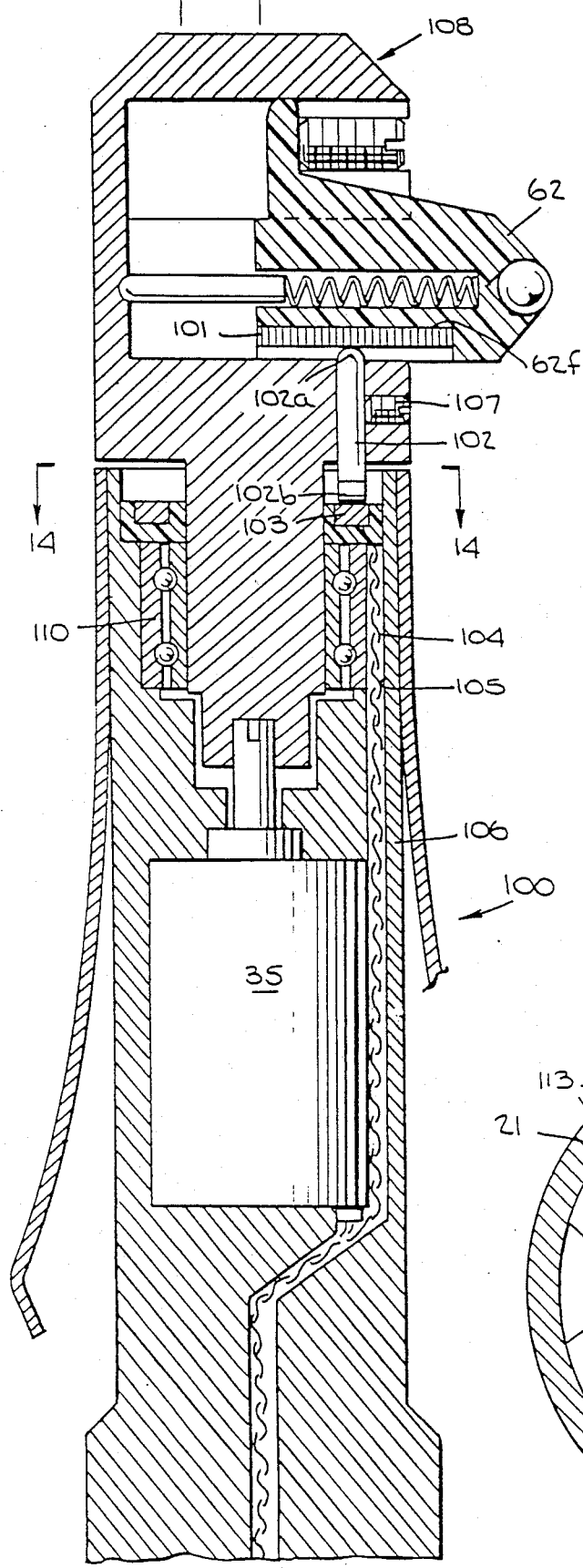
Figure 13:
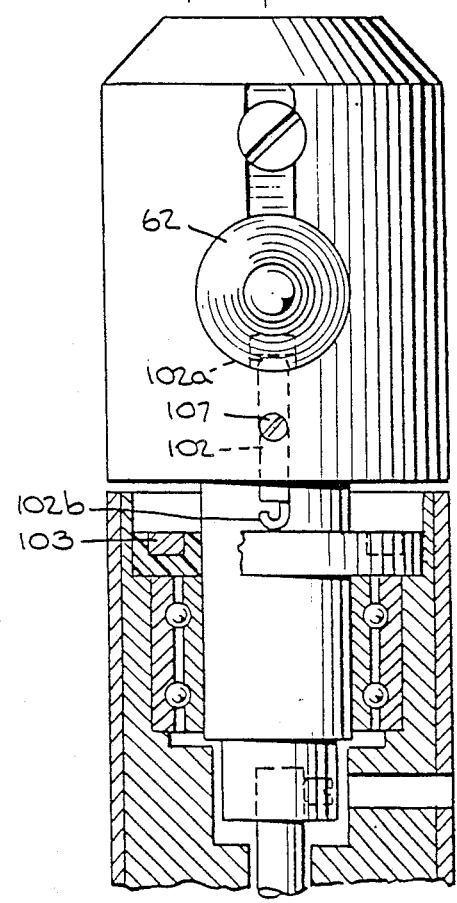
Figure 14:
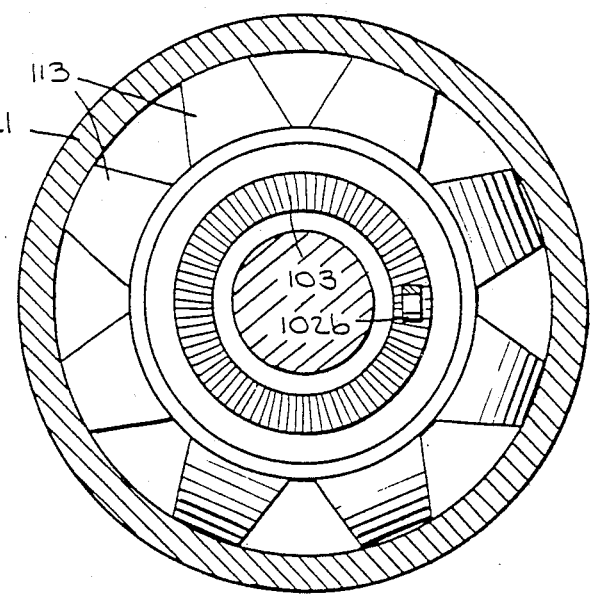
Figures 15, 16:
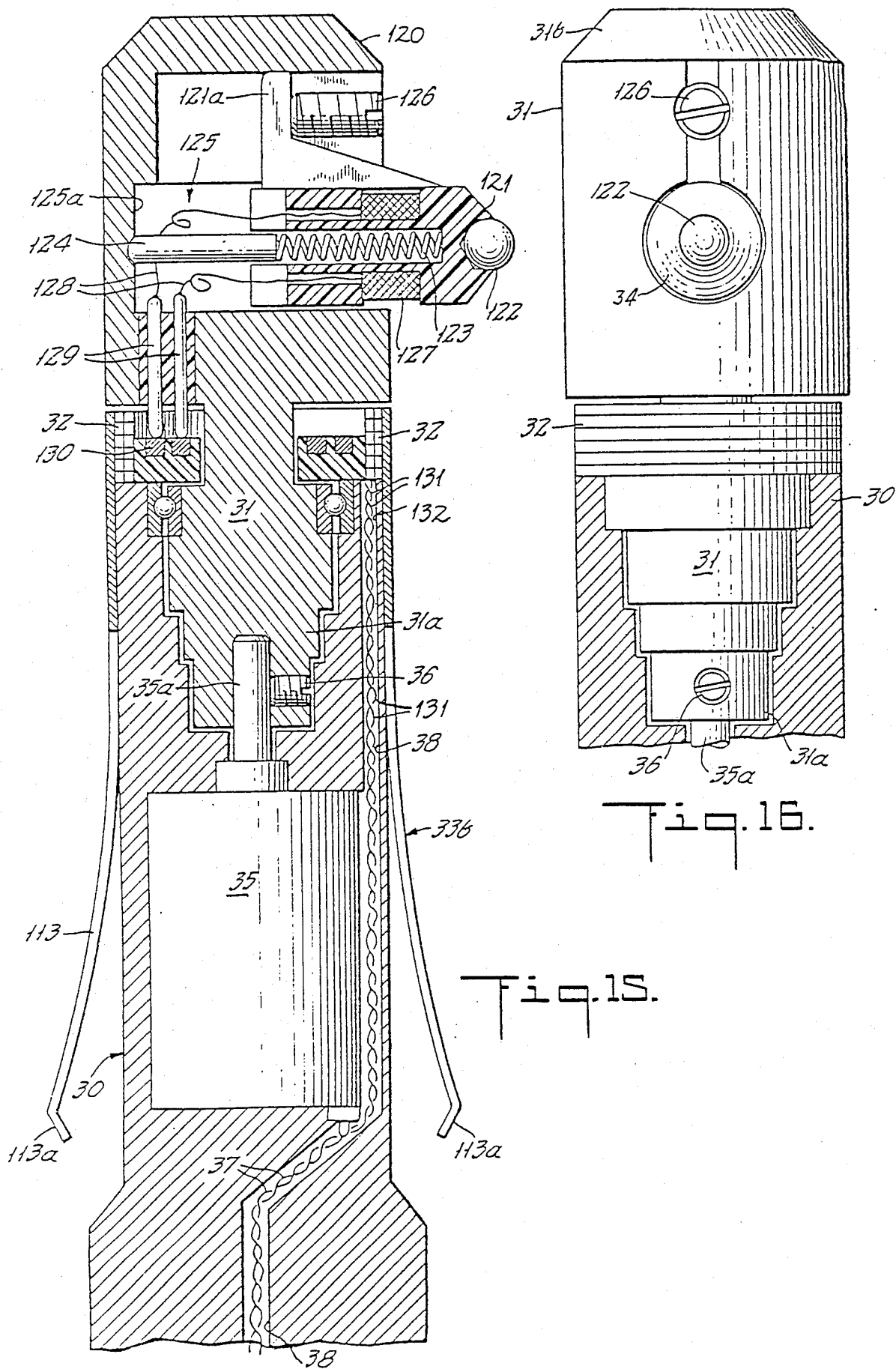

FIG. 12 a fragmentary side-sectional view of an inspection probe embodying a further modified form of the present invention;

FIG. 13 is a fragmentary sectional front view of only a part of the inspection probe of FIG. 12;

FIG. 14 is an enlarged cross-sectional view taken along the life 14—14 in FIG. 12;

FIG. 15 is a fragmentary sectional side view of an inspection probe embodying still another modified form of the present invention; and FIG. 16 is a fragmentary sectional front view of only a part of the embodiment shown in FIG. 15.

Referring to FIG. 1, a rotating head profilometer probe according to the present invention is generally indicated by reference numeral 20, and is shown prior to its insertion into any tube 21 of a tube bundle 22, such as in a vertically arranged steam generator, for the purpose of tracing the interior profile of the tube. Although not illustrated, the steam generator in which the tube bundle 22 is disposed may be a conventional vertical shell and U-tube heat exchanger of the type used in the nuclear power industry as part of a pressurized water reactor (PWR) plant which produces steam to drive electric power producing equipment (not shown). Typical steam generators of this type have more than 3,000 tubes 21, made of Inconel metal and mounted in bundle-like fashion extending upwardly from a steel tube plate 23 to a U-shaped bend at the top, and thence back to the tube plate 23. The tubes are maintained in fixed, spaced apart relation to adjacent tubes throughout their lengths by usually six or seven longitudinally spaced-apart steel tube supports, only one of which is indicated by reference numeral 24 in FIG. 2. As is well-known, high temperature, high pressure water (primary water) is circulated through the U-tubes 21, and relatively low temperature, low pressure water (secondary water) is introduced into the steam generator around the tube bundle during operation. The primary water which flows and collects heat from a heat source, such as a nuclear reactor, transfers the heat through the walls of the tubes 21 to the secondary water which is thereby generated into steam. Having flowed through the nuclear reactor, the primary water could be contaminated with radiation and it is therefore necessary that any such contamination be contained on the primary side of the system, and not be allowed to pass through any tube 21 to the secondary side. Although the level of such radio-activity in the primary water may be low, any leakage of this water into the secondary water system is not acceptable, and requires shutdown of the nuclear power plant.

Such leakage through any tube 21 probably would be the result of corrosion cracking of the tube, as at 21a (FIG. 3), which occurs as a result of the buildup of corrosion products 25 between any tube 21 and either the tube supports 24 or the tube plates 23. Such buildup occurs due to small differences between the temperature of the bulk water surrounding the tubes and tube support plates within the shell, and that of the water/steam in the annuli between the tubes and the drilled holes in the support plates through which the tubes pass, which results in deposit within the annuli of impurities from the bulk water. Corrosion of the drilled hole surfaces in the steel support plates is accelerated and, since the corrosion products are more voluminous than the steel from which they are generated, the tubes become distorted or "dented" as indicated in FIG. 2. As tube distortion increases, a variety of tube shapes develop and, as the strain in the tube wall increases, the tube becomes increasingly susceptible to stress corrosion cracking and, ultimately, complete rupture.

Although "denting" of the tube as indicated in FIG. 2 indicates that strain has developed in the tube, I have found that the amount of strain being developed is not necessarily proportional to the degree or extent of denting. That is, some tubes which seemed excessively dented such that a plug-type gauge moving through the tube would not pass the dent, were shown by computation not to have developed serious strain as might indicate incipient corrosion cracking, were the tube to remain in service. In other cases, tubes exhibiting very little denting were shown by computation to have developed significantly dangerous strain patterns, such as would require their removal from service to avoid cracking during subsequent operation of the steam generator. As previously mentioned, significant actual strain is a function both of hoop strain and of bending strain in the longitudinal direction, the axial strain being considered negligible. Using the profilometer probe of the present invention and an associated computer into which the signals from the probe are fed and analyzed by comparisons with known standards, it is possible to determine such actual strain being experienced in any given tube, so that the tube can be preventively plugged at both of its ends to remove the tube from service during subsequent operation of the steam generator. By limiting the preventive plugging to those tubes in which the strain is actually becoming excessive, rather than arbitrarily plugging tubes in which the minor diameter has been decreased below an arbitrary value, the total number of tubes to be plugged can be reduced, and the service life of the steam generator can be extended.

Referring again to FIG. 1, the rotating head profilometer probe 20 is mounted on the end of a stiff but flexible wire carrying tubing, hereinafter referred to as a wire cable 26 by which it is pushed and pulled through the tube 21 whose profile is to be determined. The cable 26 has electric wires therein, as diagramatically indicated by reference numeral 27. The electric wires are connected to a computer and/or recording apparatus, which is only diagramatically indicated by reference 28. The electro-mechanical operation of the probe 20 is powered by an exterior electrical source (not shown), which may be within the computer/recorder 28, in which the electro-mechanical output from the probe 20 is recorded or utilized. The flexible cable 26 is, of course, longer than the length of any tube 21.

For greater accuracy, readings are taken from the profilometer probe only as it is pulled from the opposite end of the tube 21 back towards the open end through which it was initially inserted. Steady tension and pulling movement on the cable 26 is controlled by a variable speed drive 29, such as a D.C. stepping motor, which drives a pair of tension drive rolls 29a, 29b between which the cable 26 is passed.

The profilometer probe 20 is made of non-magnetical material, preferably stainless steel, and has a main body 30, to an end 30a of which the flexible cable 26 is attached, as by a cable coupling 26a. The main body 30 mounts an axially rotatable head 31 on its opposite, free end 30b, and a stationary eddy current locator coil 32 at a location near the free end 30b as shown, for reasons as will be explained. In addition, the main body 30 carries a pair of spaced-apart resilient, slide type centering guides 33a, 33b respectively adjacent to its ends 30a, 30b, as shown. The centering guides 33a, 33b are stationary on the body 30. The rotatable head 31 mounts a transverse, laterally projecting, deflectable sensing member 34, for a purpose as will be described. As illustrated by the arrows A in FIGS. 2 and 3, when the probe 20 is within any tube 21 its rotatable head 31 is centered within the tube and the sensing member 34 slides in contact with the interior surface of the tube and moves in a spiral pattern to sense its profile, as the rotatable head 31 is rotated and the probe 20 is drawn through the tube 21 in longitudinal direction as indicated by the arrow B in FIG. 2.

Referring now to FIG. 4, rotation of the rotatable head 31 is effected and maintained at a constant rate by a gear motor generally indicated at 35, which has a rotatable output shaft 35a attached, as by set screw 36, to a lower end 31a of the rotatable head 31. The gear motor 35 is mounted within the main body 30, and has electrical leads 37, which pass through an appropriate channel 38 to be coupled to the electric wiring 27 (FIG. 1).

Referring to the sensing member 34 which projects radially outward of the rotatable head 31 as shown in FIGS. 4 and 5, in the preferred embodiment of the invention, the sensing member takes the form of an inverted L-shaped body 34 which is pivotally connected at its apex 34b by a pin 40 to the rotatable head 31, the pin 40 being disposed transversely within an appropriately shaped slot 41 of the rotatable member 31 so that the lower leg or end 34a of the sensing member 34 can move radially inwardly and outwardly, within the slot 41. At the radially outward projecting lower end 34a of the inverted L-shaped sensing member body 34 there is mounted a jewel 42, preferably sapphire, which rides against the interior surface of the tube 21 when the probe is passing through the latter. A substantially U-shaped spring 43, whose ends 43a, 43b are wound around the pin 40 on either side thereof, biases the sensing member lower leg 34a in the radially outward direction of the probe 20. For this purpose, it will be noted from FIG. 4 that the spring 43 also has a pair of outwardly projecting straight portions 43c at its upper ends 43a, 43b, located on either side of the sensing member 34, which bear against the roof 41a of the slot 41 to impart the outward bias on the lower end 34a of the sensing member 34. The U-shaped middle body portion of the spring 43 engages a transverse notch 44 adjacent to the lower end of the sensing member 34, as shown.

The substantially longitudinal movement of the shorter leg or end 34c in response to the radially inwardly and outwardly movement of the longer leg or end 34a of the inverted L-shaped sensing member 34, imparts corresponding longitudinal movement to an elongated, longitudinally extending magnetic core member 50a of a linear variable differential transformer 50 mounted within the rotatable probe head 31, as shown in FIG. 4.

As is generally known, the linear variable differential transformer (LVDT) is an electromechanical device which will produce an electrical output proportional to the displacement of the movable core 50a. The LVDT has a primary coil 50b and two secondary coils 50c on either end thereof, enclosed in a cylindrical stainless steel casing 50d. The magnetic core 50a provides a path for the magnetic flux linking the coils. The primary coil 50b is energized by alternating current, and voltages are induced in the secondary coils 50c which are wired in series-opposing fashion so that the induced voltages have opposite polarities. The net output from the transformer 50 is the difference between these voltages, which is zero when the core 50a is centered on the primary coil, which is referred to as its "null" position. When the core 50a is moved longitudinally to another position nearer one secondary coil 50c or the other, the induced voltage in the secondary coil towards which it is moved increases, while the voltage in the opposite secondary coil decreases. Thus, a differential voltage output is produced which varies linearly with changes in the position of the core 50a.

In the embodiment of the invention being described, the cylindrical LVDT transformer coil 50 is mounted along the longitudinal axis of the cylindrically shaped rotatable head 31, as shown in FIG. 4. Its core member 50a extends towards the outer end 31b of the rotatable head 31 to a location within the slot 41, as shown, and is biased in such direction by a coil spring 51 retained thereon by a retainer 52, the spring being seated against the body of the rotatable member 31 within an appropriately shaped spring slot 53. The bias of the spring 51 retains the end of the core 50a in engagement with the underside surface of the shorter leg or end 34c of the L-shaped pivotal sensing member 34. As indicated in the drawing, in the outwardly biased position of the sensing member 34 the downward pressure exerted by the shorter end 34c thereof compresses the spring 53 and urges the core 50a towards the rearward most of the secondary coils 50c. Thus, when the longer leg or end 34a of the sensing member 34 is depressed in radially inwardly direction, against the bias of its spring 43, the pressure of the shorter end 34c on the end of the core 50a is reduced, permitting the latter to move upwardly in response to the upward bias of its spring 53. The core 50a thus moves to its null position, centered on the primary coil 50b, and beyond, depending upon the extent of inward depression of the longer leg or end 34a, whereby a change in voltage in the coils 50c is produced depending upon the denting or not of the interior profile of the tube 21 when the probe is passed therethrough, as indicated in FIG. 2.

Electrical communication from the exterior of the tube to the LVDT is effected by six slip-ring commutators between the relatively fixed main body 30 and the rotatable head 31, as seen in FIGS. 4 and 5. These six slip-ring commutators 55 provide three separate electrical circuits, the first for energizing the primary coil 50b, and the remaining two for sensing the induced voltages in the secondary coils 50c. The wiring 57 therefrom passes through the wire slot 56 and thence into the slot 38 of the main body 30, and is a part of the electrical wiring 27 diagramatically illustrated in FIG. 1.

FIGS. 6 and 7 show a modified form of profilometer probe 60 in accordance with the invention, whose main body portion 30 similarly includes the gear motor 35 whose shaft 35a drives the rotating head 61 thereof, the shaft being attached to the inner end 61a of the rotating head. The rotatable head 61 includes essentially the same type of LVDT profile sensing apparatus 50 as in the previously described embodiment. However, the longitudinally extendingunit 50 is displaced laterally from the longitudinal axis of the probe 60, as shown, so that its longitudinally movable magnetic core member 50a will more conveniently engage the tapered surface 62a of a linearly slidable sensing member 62, as seen in FIG. 6. That is, with reference to both of FIGS. 6 and 7, the somewhat cylindrically shaped main body 62b of the radially slidable member 62 slides transversely within the circular slide opening 63, its circumferential orientation being retained by a projecting portion 62c which slides within the co-mating slot opening 63a. The portion 62d engages the set screw 64 to retain the slidable member 62 within the slide opening 63 when the slidable member is biased radially outwardly to its farthest extent by its spring 65, which is mounted within a spring aperture 62e and acts against a fixed pin 66. The pin 66 is attached at its inner end 66a to the inner wall of the slide slot 63. The magnetic core 50a of the LVDT unit 50 is biased in the longitudinal direction towards the tapered surface 62a of the slidable member 62, by a coil spring 67 which is biased in that direction. Electrical connections, as previously described in connection with the FIGS. 4 and 5 embodiment, extend between the LVDT unit 50 and the cable 26 via the commutator rings 55.

The slidable member 62 mounts a jewel 68 at its outer end for slidable contact with the interior of the tube wall to be examined. Thus, any denting in the tube wall will depress the slidable member 62, whereupon its angularly disposed slide surface 62a will depress the LVDT core 50a against the upward bias of the spring 67. In this manner, and as previously described, a net differential voltage is induced in the secondary coils 50c of the LVDT which will be detected at the recorder/computer 28 (FIG. 1). When the probe, as it is drawn through the tube 21, passes beyond the dented region, the bias of the sensing member spring 65 urges the slidable member 62 in radially outward direction to maintain sliding contact between its jewel 68 and the tube interior wall surface, whereupon the magnetic core 50a moves longitudinally in engagement with the slide surface 62a by the urging of the spring 67, resulting in an opposite change in the net differential voltage in the coils 50c.

Figure 8:
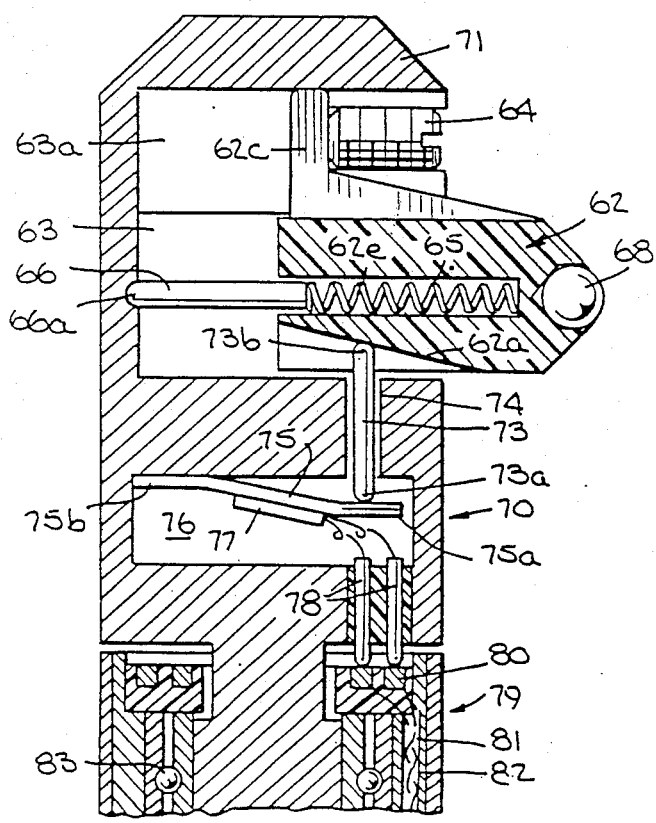
FIG. 8 is a fragmentary side-sectional view of an inspection probe embodying another modified form of the present invention.
Figure 9:
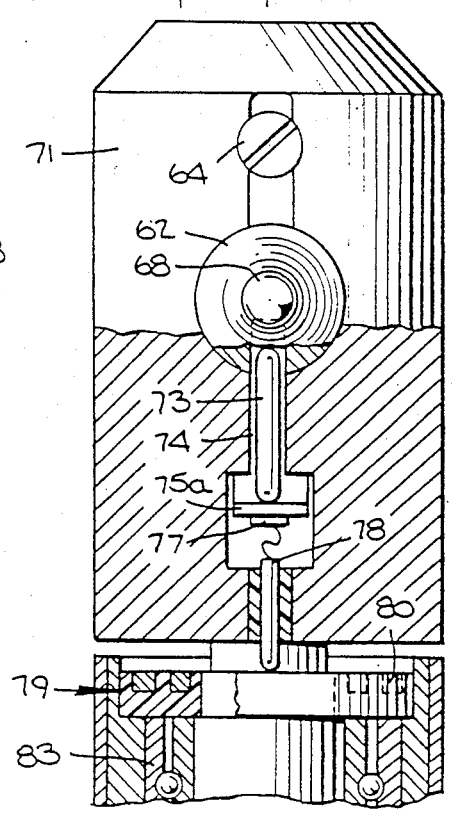
FIG. 9 is a fragmentary sectional front view of the FIG. 8 showing.

Referring now to the embodiment of FIGS. 8 and 9, the rotatable head 71 of the profilometer probe 70 carries a similar transversely slidable sensing member 62 within suitable slide apertures 63, 63a, the slidable member 62 being biased in the radially outward direction of the coil spring 65 which acts against the fixed pin 66 attached to its end 66a to the interior wall of the slide slot 63. Thus, the jeweled end 68 of the sensing member is urged against the interior of the tube whose profile is to be determined. The slidable member 62 is retained in its circumferential position by a projecting portion 62c which abuts against a stopscrew 64, as in the FIGS. 6 and 7 embodiment. The radially slidable sensing member 62 also has a tapered surface 62a, which tapers as shown in FIG. 8 and engages a slidable pin 73, disposed longitudinally with respect to the axis of the cylindrical probe 70. The pin 73 is slidable within a pin aperture 74 of the rotatable had 71. Its lower end 73a is in engagement with the free end 75a of a leaf spring 75 whose opposite end 75b is attached within a spring recess 76 of the rotating head 71. The bias of the spring 75 retains the slidable pin 73 within the slot 74, so that the upper end 73b of the pin is always in engagement with the angular surface 62a of the slidable member 62.

A strain gauge 77 is attached to the leaf spring 75, so that deflection of the leaf spring activates the gauge in well-known manner. Electrical leads 78 from the strain gauge are coupled to electrical leads 81 in the main body 79 of the probe 70 via a pair of slip-rings 80 mounted on the upper end of the main body 79, with which the electrical leads 78 are in contact. The electric wiring 81 is disposed within the wiring slot 82 to lead the electrical output from the strain gauge 77 to the wiring 27 within the flexible wire cable 26 (FIG. 1), leading to the recorder/computer 28.

Although not illustrated in FIGS. 8 and 9, it will be understood that the rotatable head 71 is driven by an electric gear motor mounted within the main body 79 of the probe 70. As partially seen in FIGS. 8 and 9, the rotatable head is journaled on bearings 83, which are cylindrical type bearings disposed concentrically with the longitudinal axis of the probe 70. In the embodiment shown, the bearings are ball bearings, but needle bearings or any other suitable type might be used.

Thus, as the probe 70 with its rotating sensing head is moved longitudinally through any tube 21 whose interior profile is to be determined, the jewel 68 at the end of the sensing member 62 rides in engagement with the interior wall of the tube. Should a dent be encountered, the slidable member 62 is depressed in radially inward direction, against the bias of its spring 65, whereupon the tapered surface 62a depresses the slide pin 73 which, in turn, depresses the leaf spring 75 against its bias. Such deflection of the spring 75 changes the electrical condition in the strain gauge 77 in known manner and, therefore, the currentflow therethrough, which change can be read and interpreted at the recorder/computer 28 (FIG. ).When the dent is passed and the normal radius of the tube is encountered, the slidable member 62 is urged radially outward by its spring 65 to retain its jeweled contact 68 in engagement with the interior tube wall, and spring 75 rises.

Figure 10:
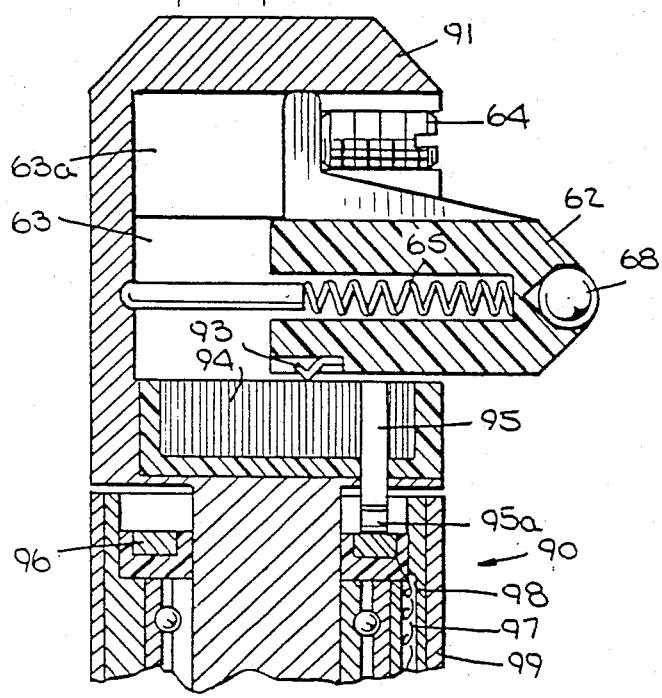
FIG. 10 is a fragmentary side-sectional view of an inspection probe embodying a further modified form of the present invention.
Figure 11:
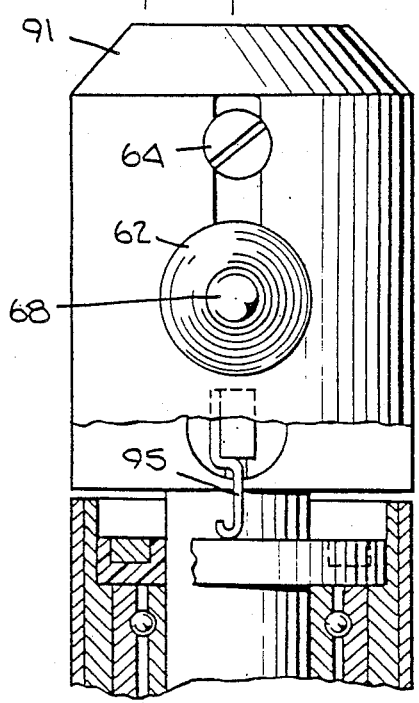
FIG. 11 is a fragmentary sectional front view of the FIG. 10 showing.

Another modified form of sensing apparatus in accordance with the invention is illustrated in FIGS. 10 and 11. In this embodiment, the rotating head 91 of the probe 90 mounts a radially inwardly and outwardly slidable sensing member 62, as in the previously described embodiment. The slidable member is biased outwardly by a spring 65, and is retained within the slide slot 63, 63a by a stopscrew 64. However, the slidable member 62 carries a rheostat contact 93 which engages a wound coil rheostat 94 attached to the rotatable head 91. Electrical connection to the coil is via an electrical conductor rod 95 whose curved end 95a projects from the rotatable head 91 and rides on a slip-ring 96 mounted on the main body 99 of the probe. The slip-ring 96 has electrical communication, via electric wires 97 within the wire slot 98 of the main body 99, to electric cable wiring 27 and thence to the computer/recorder 28 (FIG. 1). Thus, the radially inwardly and outwardly slidable movement of the sensing member 62 and the resulting slide contact of the rheostat contact 93 with the rheostat coil 94 causes a change of electrical resistance in the rheostat circuit, which includes the body of the rotatable head as an electrical ground, which change is detected by the recorder/computer 28.

FIGS. 12, 13 and 14 show a variation of this rheostat-sensing member, in which an electrical resistance tape 101 is attached along the radially extending surface 62f of the slidable sensing member 62, and a conductor member 102 mounted on and projecting from the rotatable head 108, serves as a rheostat contact at its end 102a. The lower end 102b is curved, and projects from the rotatable head into contact with the slip-ring 103 on the main body 106 of the probe 100. The conductor member 102 is retained in fixed position on the rotatable head by a set screw 107, as shown. Electrical leads 104 are disposed within the wire slot 105 of the main body 106, leading from the slip-ring 103 to the wire cable 26. Thus, radially inward and outward movement of the sensing member 62 changes the electrical resistance within the current path formed by electric leads 104, slip-ring 103, contact 102, resistance tape 101, and the body of the rotatable head 108 of the probe, which serves as an electrical ground. The rotating head 108 is journaled on cylindrical ball bearings 110, and is driven by a gear motor 35, as in the previously described embodiments.

Referring now to FIGS. 15 and 16, a further modified form of sensing member is illustrated. The rotating head 120 carries a transversely slidable sensing member 121, which has a sapphire jeweled end 122 for sliding contact with the interior wall surface of any tube or conduit whose profile is to be determined. The slidable sensing member 121 is urged by a coil spring 123 in the radially outward direction, its movement being guided on the fixed pin 124, which is attached to the inner surface 125a of the slide slot 125 formed in the rotatable head 120. As in the previously described embodiments, the sensing member has a projecting portion 121a which, by its abutment with a set screw type stop 126, prevents the sensing member 121 from disengaging from the slot 125 in response to the bias of the spring 123.

However, in this embodiment, sensing of the tube characteristics is by means of a cylindrical eddy current coil 127 which is disposed about and set into the sensing member 121. The eddy current coil is energized by electrical wires 128 which make contact, through contacts 129, with slip-rings 130 which, in turn, are connected to the wiring 27 in the wire cable 26 (FIG. 1) via electrical wiring 131 within the wire slot 132 of the probe main body 30. Since the jewel 122 is urged continuously into contact with the interior wall surface of the conduit or tube, the eddy current coil 127 is always located at a fixed distance away from the wall surface. Thus, as the head 120 is rotated and the probe and, thus, the eddy current coil are moved steadily through an undented length of the tube, or a length along which the tube wall thickness is uniform, there is no change in the electrical condition of the coil 127. However, as the probe approaches a tube portion having a changed wall thickness, such as a dent, pit or crack, a change will be induced in the flow of electric current through the coil 127. This change is sensed at the recorder/computer 28 (FIG. 1) and, thus, the changing characteristics of the tube interior is determined, and any change in wall thickness is detected.

Referring again to FIGS. 1 and 2, it will be understood that the probe body is centered within any tube 21 as it is moved therethrough, by the pair of centering guides 33a, 33b which are included in all of the probe embodiments described. Each of the guide members 33a or 33b is a cylindrical, flower-shaped arrangement of a plurality of outward tapering leaf springs 113 which are equally spaced about the periphery of the probe. The guide units are press fit or otherwise attached to the body in spaced-apart relation to each other, at opposite ends of the probe body, the guide unit 33b being adjacent to the rotating head, and the guide unit 33a being positioned near the cable coupling 26a. Thus, the probe is stabilized as it passes through any tube 21 to prevent its pitching or yawing, and thus maintain the accuracy of its positioning with respect to the interior wall of the tube. In the illustrated embodiment of the centering guide 33a, 33b, the leaf springs 113 are attached to the probe body at one of their ends, and their opposite outwardly projecting ends 113a are free. The ends 113a have inwardly bent tips, as shown, for smoothness of their longitudinal sliding movement through the tube. These finger members 113 are moderately flexible, and will flex individually as the indentations are encountered. They are made of non-magnetic spring steel material, so as not to interfere with the electro-magnetic operation of the probe, as will be understood.

As seen in FIG. 2, the eddy current locator coil 32 is attached at a location along the length of the main body 30 of the probe, close to its rotating head 31, and consists of a wire coiled about the body, as is well known. The coil 32 has electrical leads 114 within the main body 30, which also connect to appropriate continuation wires within the wire cable 26.

In any of its embodiments, the probe main body, the rotatable head including its sensing member, and the wire cable 26, as well as the coupling 26a, are all made of non-magnetic material. For example, the probe body and its rotatable head are preferably made of stainless steel, but could be made of suitable plastic, if otherwise appropriate. The centering guides 33a, 33b may be made of non-magnetic spring steel as previously mentioned, or of aluminum, or possibly of plastic if appropriate. Similarly, the wire cable 26 may be rubber or plastic coated wire.

The manner of use of the profilometer probe will now be described with reference to FIGS. 1 and 2, in which it is used to sense the interior profile of any of the steam generator tubes 21. In this regard, it will be understood that the tubes 21 have inverted U-shape, and may extend some 40 feet upwardly to the top of the steam generator and downwardly to an opposite open end again at the bottom of the steam generator, at the tube plate 23. Tubes 21 are each about seven-eighths of an inch in diameter and, therefore, the diameter of the main body 30 of the probe as well as that of the rotatable head 31, is somewhat less, e.g., about one-half an inch. The diameter of the outwardly projecting centering guide fingers 113 is, of course, about one inch so that they will somewhat stiffly engage the tube interior wall. The overall length o the probe is about 7½ inches or less, which permits it to follow around the bend of the U-shape at the tops of all but the sharpest curved U-tubes.

Referring to FIG. 1, the probe is positioned beneath the open end of a tube 21 as shown,and is introduced into the tube and fed upwardly therethrough, continuing around the top of the inverted U-shape and thereafter to the bottom of the tube at its opposite open end, a distance of perhaps more than 80 feet. However, if desired or if the probe will not easily traverse the U-shaped bend, the feeding of the probe may be stopped when it raches such bend. The probe and its wire cable 26 are fed into and through the tube 21 by driving the drive rolls 29a, 29b. The rolls 29a, 29b are driven by the drive means 29 for convenience in changing the speed of the rolls. The rotatable head 31 need not be rotating, nor need the sensing elements of the probe be energized, at this time.

After the probe is fully inserted within the tube to its opposite end, or to the U-shape, the probe is activated by energizing its eddy current coil 32 and its sensing member 34. In addition, the gear motor 35 is started, to cause the rotatable head 31 to rotate at a constant speed of about one revolution per second. The direction of rotation of the drive rolls 29a, 29b is then reversed, so that the wire cable 26 and profilometer probe 20 are withdrawn from the tube 21, during which time the readings from the probe are taken. The pulling speed of travel of the probe within the tube is varied between a relatively fast rate of about one foot per second along the tube lengths which are intermediate the tube support plates 24, and a relatively slow rate of about one-eighth of an inch (⅛") per second, or momentarily stopped if desired, adjacent to each location of a tube support plate 24, the latter being the locations of interest where tube denting is most likely to occur. The eddy current locator coil 32, located close to, but still in advance of the rotating sensing head 31, senses and provides signals corresponding to each tube support plate 24 in advance of the arrival of the sensing head 31, so that by using the signals from the coil 32 to control the drive means 29 the rate of travel of the probe can be reduced or, if desired, stopped, to take more readings at each of the support locations. As the eddy current locator coil 32 moves beyond the support location and signals that it is now moving along an intermediate length of the tube, the speed of the drive rolls 29a, 29b can be increased so that relatively few revolutions of the rotating head 31 take place during the probe travel in these regions. If desired, the rotation of the rotatable head may be discontinued during the travel of the probe in these regions.

It will be observed that the eddy current locator coil 32 is not employed as it usually is employed in the prior art, namely, to detect tube defects. Instead, the tube defects are detected by the sensing member and its associated equipment, and the locator coil 32 is used to control the speed at which the probe is pulled through a tube. Thus, if the probe were pulled through a tube 40 feet long at a constant slow rate, e.g. ⅛ in./sec., needed for proper examination of a defect, it would take 64 minutes for the probe to be pulled through the tube. However, assuming that there are six support plates and that the probe is moved at such slow rate for 2 in. each side of a support plate and moved at one foot/sec. otherwise, the time for the probe to be moved through the tube would be only about 3.8 min. which is a saving of about one hour. Since the steam generator may have 3000 tubes to be inspected such a saving is very significant.

The sensing member on the rotating head cannot be relied upon to give an accurate indication of the location of tube supports because the sensing member indicates only defects. Although defects usually occur at or adjacent to the tube supports, defects may occur at any portion of the length of a tube. Even though an eddy current coil by itself does not provide sufficient information to properly predict tube life, it provides readily recognizable signals as to tube support locations.

As the rotating head profilometer probe 20 is drawn steadily outwardly from the tube 21, the jeweled tip 42 of its revolving sensing member 34 is urged against the interior wall surface of the tube, and the radial position of the sensing member relative to the rotating member 31 is therefore continually measured in the embodiments shown in FIGS. 2-14. Thus, the tube radius variation in both the axial and circumferential directions are recorded, and may be displayed in graphic form by the computer/recorder 28. The profile display will also be correlated with the tube support plate locations, as aforesaid. Using a program for calculating strain from tube profile distortion input values received from the probe, the computer will indicate the amount of strain being experienced at these tube support locations and elsewhere, and will indicate occurrences of any excessive strain as compared with predetermined limits. In the latter event, the tube can be preventively plugged so as to be effectively removed from use.

Although the embodiment shown in FIGS. 15 and 16 operates in a somewhat different manner in that it does not measure the radii of a tube, nevertheless, it provides information as to physical characteristics of the tube, e.g. wall thickness at dents, pits and cracks, which has been found to be adequate to predict tube life accurately.

As the probe shown in FIGS. 15 and 16 is drawn steadily outwardly from the tube 21, the jeweled tip 122 of its revolving sensing member 34 is urged against the interior wall surface of the tube, keeping the eddy current coil 127 a constant distance from the inner surface of the wall of tube 21. The coil 127 will provide signals indicating the thickness of the wall of tube 21, thereby indicating the variation in wall thickness of dents and pits, and indicating cracks. Such signals are continuously recorded and may be displayed in graphic form by the computer/recorder 28. The display will also be correlated with the tube support plate locations, as aforesaid.

Of course, further modifications of the construction and/or arrangement of the profilometer probe are contemplated in accordance with the invention. For example, and although not illustrated, the eddy current locator coil 32 (FIGS. 1 and 2) might be disposed at a middle location along the length of the probe main body 30, between the centering guides 33a, 33b, instead of immediately adjacent to the rotatable head 31 as illustrated. With reference to any of FIGS. 4-7, to eliminate the slip-rings 55 and perhaps simplify the construction in other respects, the motor drive shaft 35a might be provided with a hollow, non-magnetic shaft extension, extending towards, and attaching to the inner end of the rotatable head 31, with the shaft extension passing through the LVDT core opening. In such modification, the LVDT core 50a would slide within the rotating shaft extension, and emerge from the open end of the shaft extension into contact with the shorter leg 34c of the pivotable sensing member 34. A spring would bias the LVDT core into such engagement, as by a coil spring between the end of the motor shaft 35a and the adjacent end of the LVDT core 50a.

Still another arrangement might be to mount the drive motor 35 within the rotatable head 31 itself, with appropriate connection of its then inverted drive shaft 35a to the main body 30, and including a suitable bearing arrangement. Such might provide greater compactness of the probe, shortening its length and enabling it to pass through more sharply curved lengths of tubing or conduit.

It will also be unerstood that the probe may be made considerably larger in diameter, or its laterally projecting sensing member might be made much longer, to adapt the probe to pass through and similarly inspect the interior wall surfaces of much larger conduit, such as 10" or 12" diameter pipe conduit. Alternatively, it might be made smaller than the described embodiment, to adapt it appropriately for other uses.

Thus has been described a rotating head profilometer probe in several embodiments, and the manner of its use, which achieves all of the objects of the invention.

I claim:

1. In an apparatus for inspecting a heat exchanger tube, a composite scanner adapted to be drawn through the tube and having a cylindrical body portion, a rotatable head mounted on said body portion for rotation about the longitudinal axis of said body portion, drive means mounted on said body portion and connected to said rotatable head for rotating the latter, a sensing member movably mounted for reciprocal movement in radial direction on said rotatable head for contacting the interior wall of a tube as the scanner is drawn therethrough, said sensing member extending radially outwardly and being biassed radially outwardly of said rotatable head, signal generating means operatively connected to said sensing member for generating a first signal corresponding to the response of said generating means to the movement of said sensing member, and an eddy current sensor having a winding incorporated in said scanner electromagnetically coupled with said tube for generating a second signal corresponding to changes in the electromagnetic coupling as said scanner is drawn through said tube.

2. Apparatus as set forth in claim 1 wherein said heat exchanger tube is mounted on a metallic support plate which maintains the tube in a predetermined position and effects a unique change in the electromagnetic coupling between the winding of said eddy current sensor and said tube as the scanner traverses the tube adjacent to said support plate to thereby generate a unique change in said second signal for indicating the position of said eddy current sensor relative to said support plate.

3. Apparatus as set forth in claim 2 wherein said heat exchanger tube is mounted on and extends between a plurality of spaced apart metallic support plates which maintain the tube in a predetermined position and each of which effects a unique change in the magnetic coupling between the winding of said eddy current sensor and said tube as the scanner traverses the tube adjacent to each of said support plates to thereby provide signals for controlling the rate said scanner is drawn through said tube in accordance with the position thereof relative to each support plate.

4. Apparatus as set forth in claim 1 wherein said eddy current sensor is mounted on said body and is spaced from said sensing member in the axial direction of said rotatable head.

5. Apparatus as set forth in claim 1 wherein said sensing member comprises an L-shaped member pivotally mounted intermediate its ends on said rotatable head and wherein one of said ends of said L-shaped member extends and is biassed outwardly of said rotatable head for contacting said interior wall of a tube.

6. Apparatus as set forth in claim 1 wherein said sensing member is radially and rectilinearly movable on said rotatable head, has an end extending outwardly of said rotatable head and has a ball rotatably mounted at said end thereof for contacting said interior wall of a tube.

7. Apparatus as set forth in claim 6 wherein said signal generating means has an operating member and said operating member is engageable by said sensing member for moving said operating member with radial movement of said sensing member.

8. Apparatus as set forth in claim 6 herein said signal generating means has an operating member and said sensing member has a cam surface engaging said operating member for moving said operating member with radial movement of said sensing member.

9. Apparatus as set forth in claim 6 wherein said signal generating means comprises a resistor and a contact engaging said resistor, one of said resistor and said contact being mounted on said sensing member for movement therewith.

10. Apparatus as set forth in claim 6 wherein said signal generating means is an eddy current coil mounted on said sensor for movement therewith.

11. Apparatus as set forth in claim 1 wherein said signal generating means comprises a linear variable differential transformer with a movable core member and wherein said core member is connected to said sensing member for movement by said sensing member.

12. Apparatus as set forth in claim 11 wherein said linear variable differential transformer has electrical connecting leads and is mounted on said rotatable head, wherein said body portion has electrical connecting leads extending externally thereof and further comprising commutator means interconnecting said electrical connecting leads of said transformer and said electrical connecting means of said body.

13. Apparatus as set forth in claim 1 wherein said signal generating means is a strain gauge.

14. Apparatus as set forth in claim 1 wherein said signal generating means is a rheostat having a resistor and a contact engaging said resistor, one of said resistor and said contact being movable by said sensing member.

15. Method for determining local defects of a tube mounted on metal supports spaced from each other in the direction of the length of said tube with a relatively long and narrow profilometer having a sensing member for contacting the inner surface of the wall of the tube, said sensing member being movable transversely to the length of said profilometer and being mounted on a rotatable head, signal generating means connected to said sensing member for generating a first signal corresponding to the movement of said sensing member, and an eddy current coil for generating a second signal corresponding to the positions of said supports, said method comprising:

inserting said profilometer in the bore of said tube and, while rotating said head, moving said profilometer in the length direction of said tube with said sensing member in contact with the inner surface of said tube; and varying the rate at which said profilometer is moved through said tube in response to said second signal so that said profilometer is moved at a relatively slow rate when said sensing member is adjacent a support and is moved at a relatively high rate when said sensing member is at portions of said tube intermediate said supports.

16. Method as set forth in claim 15 wherein said eddy current coil is spaced from said sensing member in the direction of the length of said profilometer and wherein said profilometer is moved in the direction from said sensing member toward said eddy current coil whereby said eddy current coil is adjacent said supports prior to the time said sensing member is adjacent said supports.

* * * * *